United States Patent [19]

Schiffner et al.

[11] 4,400,088

[45] Aug. 23, 1983

[54] RING INTERFEROMETER WITH AN ARRANGEMENT FOR REDUCING THE INFLUENCE OF UNDESIRED LIGHT

[75] Inventors: Gerhard Schiffner, Munich, Fed. Rep. of Germany

[73] Assignee: Siemens Aktiengesellschaft, Berlin & Munich, Fed. Rep. of Germany

[22] Filed: Aug. 21, 1980

[30] Foreign Application Priority Data

Sep. 7, 1979 [DE]  Fed. Rep. of Germany ....... 2936267

[51] Int. Cl.³ .............................................. G01C 19/64
[52] U.S. Cl. ..................................................... 356/350
[58] Field of Search ............................... 356/350, 351

[56]  References Cited

U.S. PATENT DOCUMENTS 4,273,444  6/1981  Pool et al. ........................... 356/350

OTHER PUBLICATIONS

"Sensitivity Analysis of the Sagnac-Effect Optical-Fiber Ring Interferometer", Lin et al., Applied Optics, vol. 18, No. 6, Mar. 15, 1979, pp. 915-931.

*Primary Examiner*—Vincent P. McGraw
*Attorney, Agent, or Firm*—Hill, Van Santen, Steadman & Simpson

[57] ABSTRACT

A ring interferometer which has a light waveguide with two ends which act as the two separate coupling points so that light from a source can be coupled into each of the ends to travel in the light waveguide to be uncoupled from the opposite end as an output coupled light traveling in a separate output path characterized by the separate output paths of the output coupled light from the coupling point to a unification point where components are superimposed into a superimposed path directed to the light receiving surface have different lengths and the amount of the difference exceeds the coherence length of the coherent light employed in the ring interferometer.

2 Claims, 1 Drawing Figure

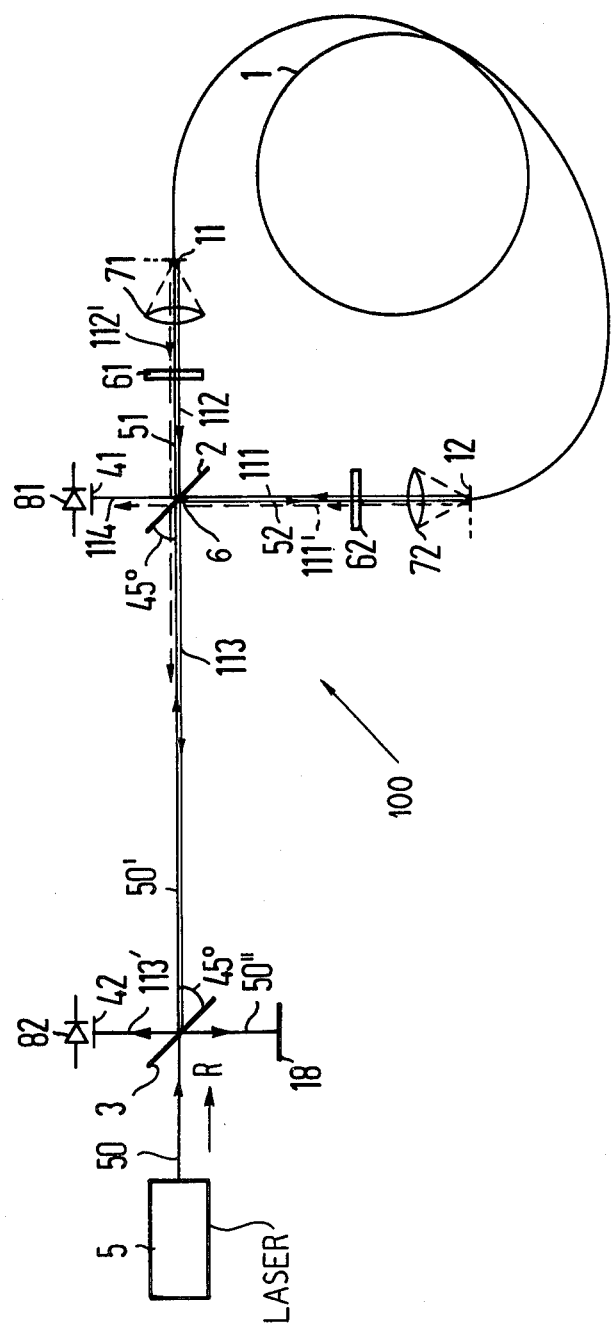

RING INTERFEROMETER WITH AN ARRANGEMENT FOR REDUCING THE INFLUENCE OF UNDESIRED LIGHT

BACKGROUND OF THE INVENTION

The present invention is directed to a ring interferometer which has a coherent light source, at least one light sensitive surface of a detector, a light waveguide which is wound in a coil and has two ends, each end providing a separate coupling point at which light from the coherent source is coupled into the light waveguide and propagated to the opposite end for output coupling therefrom along separate output paths, the interferometer includes an arrangement for receiving the output coupled light traveling in the two separate output paths and combining portions thereof in a superimposed fashion to extend along a superimposed path extending to at least one of the light receiving surfaces.

Ring interferometers of this type serve for example to identify rotations and to measure the angular speed thereof. In so doing, they employ the relativistic Sagnac effect, which produces non-reciprocal transit time differences, which are proportional to the angular speed of the rotation. The Sagnac effect will apply to all polarization states of the light. A measurement is carried out of the transit time difference and thus the angular speed is determined by the integral intensity of the light receiving surfaces of the detectors. However, it should be stressed that this merely represents an example of the use of a ring interferometer and that ring interferometers of the type described in the introduction are also used for other purposes.

In ring inteferometers of this type, a component of the light, which is to be input coupled at the coupling point, is reflected as a result of the jump or change in the index of refraction or other inhomogenities. This reflected component is superimposed upon the light which is output coupled from the light waveguide at this coupling point. The reflected component together with the output coupled light is propagated as interference light towards the light receiving surfaces. The interference light including the reflected component will occur at both coupling points and produces interference in the superimposition zone whereby the intensity of the light being received on the surface of the detector is adulterated. In the present example in which a ring interferometer is used as a rotation sensor, these adulterations will cause simulated or false indications of rotations.

SUMMARY OF THE INVENTION

The present invention is directed to providing an improved ring interferometer in which the adulterating influences of interference light can be eliminated.

These tasks are accomplished by an improvement in a ring interferometer having a coherent light source, at least one light sensitive surface of a detector and a waveguide which is wound in a coil and has two ends, each end providing a separate coupling point at which light from the coherent light source is coupled into the light waveguide and propagated to the opposite end for output coupling therefrom along separate output paths, said interferometer including means for receiving the output coupled light traveling in the two separate output paths and combining portions thereof in a superimposed fashion to extend along a superimposed path leading to at least one light receiving surface, said means for combining including a unification point lying on each of said two separate output paths. The improvement comprises each of the separate output paths having a different length with the amount of the difference in the length between the two separate output paths exceeding half of the coherence length of the coherent light beam from said coherent light source, and the two light paths from the coherent source to each coupling point through the light waveguide to the unification point differ in length at a maximum by an amount which is smaller than the coherence length of the coherent light.

This improvement ensures that the interference light no longer results in interference in the superimposition zone so that the light which is output coupled from the light waveguide at each coupling point continues to remain free of interference. The interference light which is no longer capable of producing interference only produces a constant light component, which can be easily eliminated on the light receiving surface. Intensity influctuations relative to this constant light component are produced merely by the output coupled light which is capable of producing the interference.

BRIEF DESCRIPTION OF THE DRAWING

The FIGURE is a schematic illustration of an example of a ring interferometer in accordance with the present invention.

DESCRIPTION OF THE PREFERRED EMBODIMENTS

The principles of the present invention are particularly useful in a ring interferometer generally indicated at 100 in the drawing. The ring interferometer consists of a light source 5, two partially transparent reflectors or beam dividers 3 and 2, two linear polarizers 61 and 62, two optics 71 and 72, a wound or coiled light waveguide 1, and two light receiving surfaces 41 and 42 which are represented as a light sensitive surface of a light sensitive sensor or detector 81 and 82. It should be noted that the wound light waveguide 1 is preferably a monomode glass fiber and has two ends 11 and 12 which act as coupling points for the wound waveguide.

The light source 5, which is preferably a laser, emits a bundle of laser beams 50 in a direction indicated by the arrow R. The beam 50 strikes the semi-transmissive mirror or reflector 3 which is preferably inclined at an angle 45° to the axis of the beam and the direction R. The mirror 3 will reflect a component of the laser beam 50 at right angles as a partial beam 50" to strike a light absorber 18. The mirror 3 also passes a remaining portion of the laser beam 50 as a weakened beam 50' which travels in the direction R and impinges on the semi-transmissive mirror or reflector 2, which is likewise preferably inclined at the angle of 45° to the axis of the beam 50 and the direction R. Like the mirror 3, the mirror 2 will reflect a portion of the beam 50' at right angles to the axis and direction R as a partial beam 52 and pass a portion as a partial beam 51 which continues to extend in the direction R. The partial beam 51 passes through the polarizer 61 and is focused by optical lens system 71 onto an end 11 of the light waveguide 1. The partial beam 52 passes through the polarizer 62 and is focused by the lens system 72 onto the end surface 12 of the waveguide 1.

The light, which is coupled into the light waveguide 1 at one of the ends such as 11, will travel through the light waveguide and be output coupled at the other end 12. This light which is output coupled at the end 12 is focused by the lens system 72 to form an output beam 111 extending in a direction opposite to the direction of partial beam 52 and at right angles to the direction R. In a similar manner, light, which was coupled by the lens system 72 into the end 12, will travel through the waveguide 1 and exit or be uncoupled at the end 11 as an output beam 112 which is traveling in the opposite direction to the beam 51 and the direction R.

The partial beam 112 will strike the partially reflective mirror 2 at a point 6 and have a portion reflected at right angles to its path and another portion passed by the mirror to extend in a direction opposite to the direction R. In a similar manner, the beam 111 will also strike the mirror 2 at point 6 and have a portion reflected by the mirror 2 and be superimposed with a portion of the beam 112 which passed through the mirror 2 to form a superimposed portion 113 that extends opposite to direction R and beam 50'. A portion of the beam 111 will pass through the mirror 2 and be superimposed with the reflected portion of the beam 112 as a superimposed beam 114. Thus the point 6 is a unification point which lies in both output paths of the output beams 111 and 112.

The sensor or light receiving surface 41 of detector 81 is arranged in the path of the beam 114. The beam 113 will be directed at the semi-transmissive mirror 3 which reflects away a component 113' of this beam 113. In the beam path of the beam 113', the light receiving or sensor surface 42 of detector 82 is arranged.

As regard to the coherent light which is input coupled into the light waveguide 1 via the ends or coupling points 11 and 12, a component thereof is reflected or scattered by the end surfaces 11 and 12 to create an interference light 112' or 111' which travels the same light path as the light which is output coupled from these end surfaces. Thus, the interference light will reach the superimposition zones which are the beam paths for the beams 113 and 114, respectively.

In practice, the length of the light waveguide 1 is generally considerably longer than the coherence length of the useful light so that the interference light 112' or 111' which is scattered by the end surfaces 11 and 12 can no longer interfere with the light emerging via this end surface. On the other hand, the interference light components 111' and 112' reflected or scattered at the ends 11 and 12 can interfere with one another in the superimposition zones of the group of light beams 113 and 114 and can adulterate the measurements of the angular speed.

During experiments, it was proved that during coupling of light into the fiber 1, light reflected from the fiber ends 11 and 12 in accordance with the reflection laws and in addition scattered light was created. The reflected and scattered light will extend in the direction of the optical axis of the waveguide and exhibit a considerable intensity. The component reflected in accordance with the reflection law can be eliminated relatively easily for example, by means of anti-reflective coatings or by means of cutting off the light conducting fiber at an angle which differs slightly from the 90° relative to the fiber axis. However, the scattering components can not be eliminated in this manner.

In order to eliminate the adulteration of the measurements of the interference light, the invention provides that the light paths from the coupling points 11 and 12 to the unification points 6 of the beam divider 2 are selected to differ in length. The difference in length between these two light paths exceed half of the coherence length of the coherent light. However, the coherence length of the light must exceed the change in the effective optical length of the coiled light waveguide 1, which change is produced by this Sagnac effect. Generally speaking, it can be stated that the light path for the coherent light which lead from the light source 5 through the unification point 6 of the beam divider 2, along the path of beam 51 to the coupling point 11 through the waveguide 1 out the coupling point 12 and along the path 111 to the unification point 6 and the light path from the source 5 to the point 6 along the path of the beam 52 to the coupling point 12 through the waveguide 1 to the coupling point 11 and along the path 112 to the point unification point 6 may differ at a maximum in length by a quantity that is smaller than the coherence length for the coherent light.

In fact, the optical change in the length of the light waveguide 1 resulting from the Sagnac effect amounts for example scarcely more than 1 $\mu m$ whereas the difference between the spacing of the coupling point 11 and 12 from the unification point 6 of the beam divider 2 can be in the order of centimeters. In this example, when light has a coherence length of a few millimeters, the imposed conditions can be easily fulfilled. A suitable light source consists for example of CW semi-conductor diode laser which produces light with a coherence length in this range.

The above described measure ensures that the interference light which returns from the coupling points 11 and 12 can no longer produce interference so that the light which is output coupled from the light waveguide 1 via the coupling points 11 and 12 is still capable of producing interference. This ensures that the fluctuations in the integral intensity of the light receiving surfaces 41 and 42 can only originate from the interference produced by the light output coupled from the waveguide 1. The interference light, which is produced by the reflected components or the scattered components, does not produce interferences and can be eliminated as a constant light component.

The proposed solution serves not only to safely destroy the interference capacity of the light reflected from the coupling point which forms the major part of the interference light but also substantially destroys the interference capacity of the light which is back scattered in the light waveguide. The interference light, which is capable of producing undesirable interference can occur only in one direction of the light waveguide, whose length corresponds to the coherence length of the light being used and which is conducted from the unification point of the partially transparent reflector 2 via two light paths which are equal in length and which leads across the two coupling points. However this undesirable interference is manageable in comparison to the total interference light produces, and in the final outcome this undesirable light no longer produces.

It should be noted that apart from the conditions stated in applicant's improvement, no special significance need be assigned to the particular construction of the ring interferometer. Thus, for example, in place of the partially transparent reflector 2, it is possible to use any other reciprocal optical quad gate having the same properties. Thus, the partially transparent reflector or beam divider 2 can be replaced by an optical directional coupler such as proposed for example in the earlier filed U.S. patent application, Ser. No. 002,537, filed Jan. 11, 1979, which issued as U.S. Pat. No. 4,325,636 and was based on German Patent application No. 28 04 119 and whose disclosure is incorporated by reference thereto.

In addition, the ring interferometer applications are not restricted. Thus, for example, it can also be used for measurement purposes for which polarized light is not required. In the example in question, the polarizers 61 and 62 can then be eliminated. However, since polarizers often result in automatically filtered out a large proportion of the interference light, particularly that created by depolarization, it should be noted that it is often desirable to continue to use the polarizers.

Although various minor modifications may be suggested by those versed in the art, it should be understood that I wish to embody within the scope of the patent granted hereon, all such modifications as reasonably and properly come within the scope of my contribution to the art.

I claim:

1. In a ring interferometer having a coherent light source, at least one light sensitive surface of a detector, and a light waveguide which is wound in a coil and has two ends, each end providing a separate coupling point at which light from the coherent source is coupled into the light waveguide and propagates to the opposite end for output coupling therefrom along separate output paths, said interferometer including means for receiving the output coupled light traveling in the two separate paths and combining portions thereof in a superimposed fashion to extend along a superimposed path leading to at least one light receiving surface, said means for combining including a unification point lying on each of said two separate output paths, the improvements comprising each of the separate output paths having a different length between each output coupling point and the unification point with the amount of the difference of the length between the two separate output paths exceeding half the coherence length of the coherent light from said coherent light source, and the two light paths from the coherent source to each coupling point through the light waveguide to the unification point differ in length at a maximum by an amount which is smaller than the coherence length of the coherent light.

2. In a ring interferometer according to claim 1, wherein said light source is a CW semi-conductor laser diode producing light with a coherence length of a few millimeters.

* * * * *